United States Patent [19]

Ward

[11] Patent Number: 4,488,331

[45] Date of Patent: Dec. 18, 1984

[54] PEST VACUUM DEVICE

[76] Inventor: Edward L. Ward, 15545 Lemarsh St., Mission Hills, Calif. 91345

[21] Appl. No.: 543,779

[22] Filed: Oct. 20, 1983

[51] Int. Cl.³ .............................................. A01M 3/00
[52] U.S. Cl. ..................................... 15/339; 15/344; 43/136; 43/139; 383/62
[58] Field of Search ......................... 15/339, 344, 347; 55/361, 381, 524; 383/62, 71, 93; 43/136, 139

[56] References Cited

U.S. PATENT DOCUMENTS

| | | | |
|---|---|---|---|
| 2,746,078 | 5/1956 | Spurlin | 15/344 |
| 2,848,062 | 8/1958 | Meyerhoefer | 55/524 X |
| 3,214,861 | 11/1965 | Arthur | 15/344 X |
| 3,230,569 | 1/1966 | Nielsen | 15/344 |
| 4,074,458 | 2/1978 | Catlett | 43/139 |
| 4,077,562 | 3/1978 | Ballin | 383/62 X |

Primary Examiner—Chris K. Moore
Attorney, Agent, or Firm—Cislo, O'Reilly & Thomas

[57] ABSTRACT

This invention relates to an insect and the like pest disposal device designed to attach to the suction extension hose of a suction cleaning machine and to a disposable filter bag that receives and retains such pests for disposal without the necessity of having to physically contact the captured pests during the disposal operation. The device uses no insecticides nor leaves any poisonous residues. A first and second tubular member, each having an extending, elongate portion and aperture therein, cooperatively engage to define a hollow housing member. A tubular, air permeable bag, closed on one end and having an opposite extending, elongate end having an aperture therein is adapted to be received and retained in the hollow housing member to receive and retain objects entering the interior cavity of the hollow housing member.

11 Claims, 9 Drawing Figures

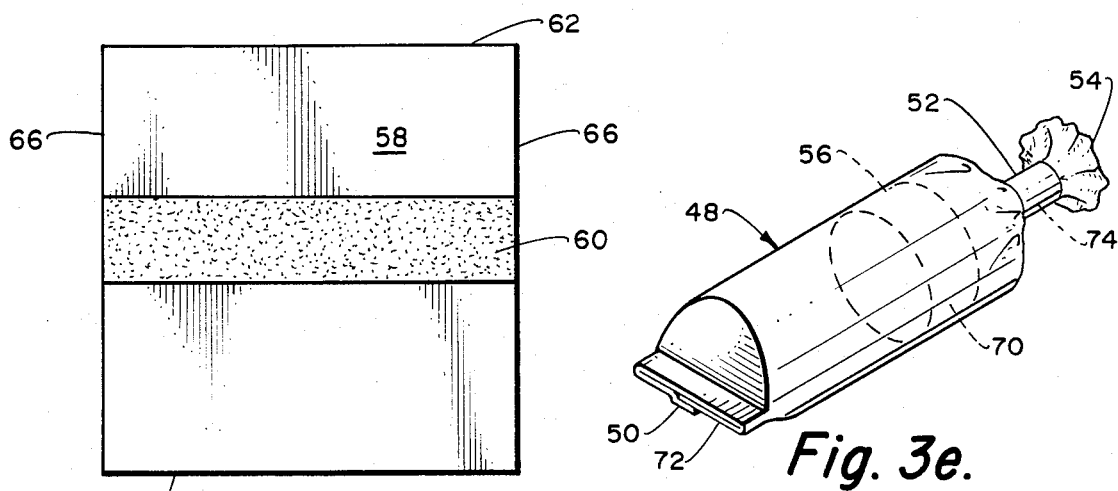
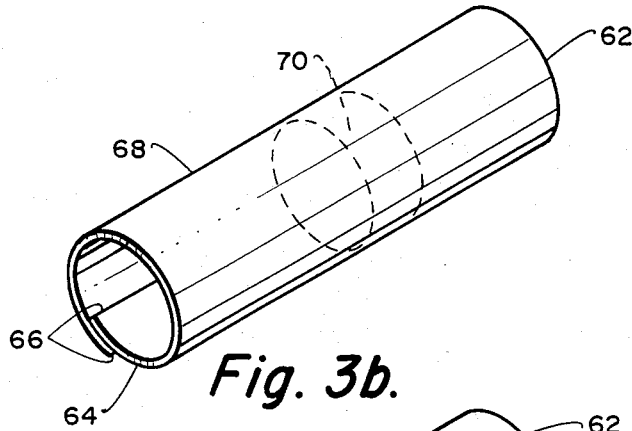
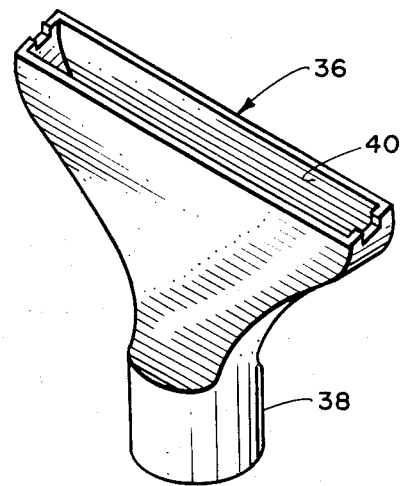
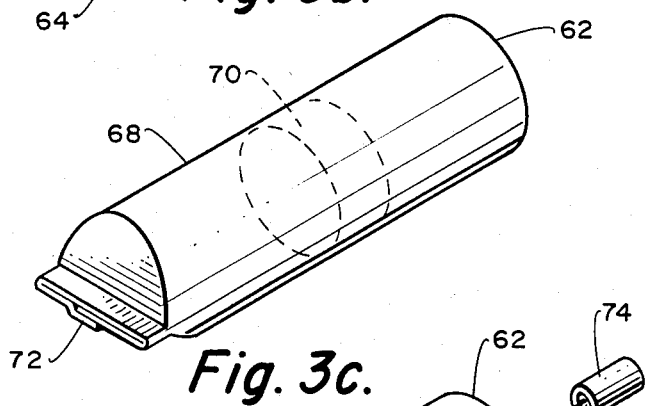
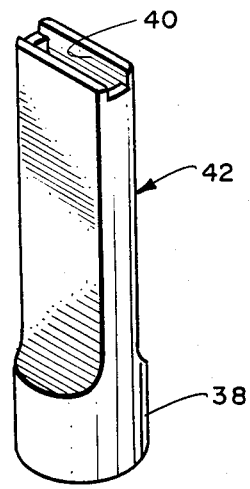
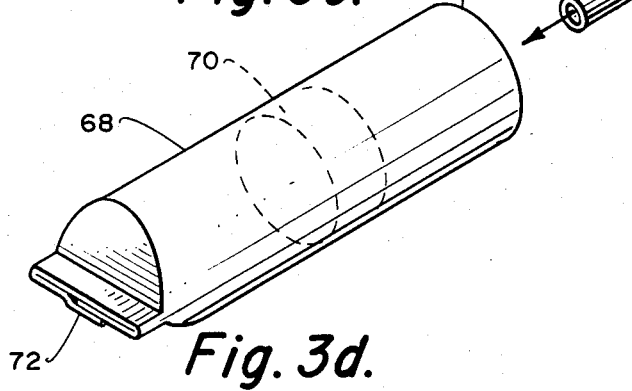

PEST VACUUM DEVICE

BACKGROUND OF THE INVENTION

This invention relates to an insect, and the like, pest disposal device designed to releasably attach to the suction extension hose of a suction cleaning machine and detain captured insects, and the like, pests, eggs and undesirable residues of same, in a disposable filter bag. There are no poisonous residues as the device is pesticide free. Likewise, disposal of the filter bag is accomplished without the need to come in contact with or handle any of the captured pests.

This device is especially useful in environments where health or safety conditions prevent the use of insecticides due to danger to human or pet life. As non-limiting examples, such environments would include, kitchens, where insecticides may contaminate stored foods, and old age homes, where infirmities may prevent patient removal thereby precluding sealed tent fumigation type operations.

This invention also relates to a disposable, tubular, air permeable filter bag having a first closed end and an opposite extending, elongate end having a mouth-like aperture therein. The filter bag has an adhesive area on its interior surface intermediate its closed end and opposite, extending, elongate end. A wire twister member is attached to the exterior surface of the filter bag adjacent the mouth-like aperture to seal the filter bag, thereby preventing the egress of pests and the like contained in the interior of the filter bag should the adhesive barrier strip become ineffective.

SUMMARY AND OBJECTS OF THE INVENTION

It is an object of the invention to provide an insect, and the like, pest disposal device.

It is another object of the invention to provide an insect, and the like, pest disposal device adapted to releasably attach to the suction extension hose of a suction cleaning machine.

It is still another object of the invention to provide an insect, and the like, pest disposal device which retains captured pests, eggs, and undesirable residues of same, in a filter bag which may be disposed of without having to come into contact with or handle any of the captured pests, eggs or residues.

It is another important object of the invention to provide an insect, or the like, pest disposal device which uses no insecticide and therefore, leaves no harmful poisonous residues which may endanger human or animal life.

It is still another important object of the invention to provide a disposable filter bag which is air permeable, has a means to retain insect, and the like, pests, eggs or other undesirable residues of same, in the interior of the bag for the disposal of same, and is adapted to be received and retained in the interior cavity of the disposal device.

It is yet another important object of the invention to provide a disposable filter bag which may be sealed without having to come into physical contact with any insect, or the like, pests, eggs or undesirable residues of same, contained in the interior of the filter bag.

In an exemplary embodiment, the invention is directed to a hollow housing having an interior cavity defined by a first tubular housing member having a first extending, elongate portion having a first aperture normal to the axis thereof and an opposite first open end, and a second tubular housing member having a second extending elongate portion having a second aperture normal to the axis thereof and an opposite second open end. The first open end of the first tubular housing member and the second open end of the second tubular housing member are releasably engaged to form the hollow housing. A tubular, air permeable filter bag is adapted to be received and retained in the hollow housing and has a first closed end and an opposite extending elongate end having an aperture normal to the axis thereof and adapted to project outwardly through the first aperture in the first tubular housing member and fold to form a lip-like portion covering a portion of the exterior surface of the first extending elongate portion of the first tubular housing member adjacent and surrounding the first aperture in the first tubular housing member. The filter bag also has a circular adhesive ring on its interior surface intermediate its first closed end and its opposite, extending elongate end and normal to the axis thereof. A tubular nozzle member is provided having a first open end adapted to receive and retain therein in a releasable friction fit, the first extending, elongate portion of the first tubular housing member and the folded lip-like portion of the extending, elongate end of the filter bag and a second open end adapted to selectively direct objects into the bore of the nozzle member. The second tubular housing member integrally forms a screen member in its interior adapted to permit air, but not the filter bag, to enter the second extended, elongate portion of the second tubular housing member. In an alternate embodiment, a screen member may be attached at its perimetric boundary to the interior surface of the second extending elongate portion of the second tubular housing member normal to the axis thereof, adapted to permit air, but not the filter bag, to exit the interior cavity of the hollow housing member.

In another exemplary embodiment, the invention is directed to a disposable, tubular, air permeable filter bag having a first closed end and an opposite, extending, elongate end having an aperture normal to the axis thereof, and a circular adhesive ring on its interior surface intermediate its first closed end and its opposite, extending, elongate end and normal to the axis thereof. A wire twister member may be attached to the exterior surface of the tubular, air permeable filter bag, normal to the axis thereof and adjacent the aperture in the tubular, air permeable filter bag in order to seal the filter bag upon its disposal.

These and other objects of the invention will become more apparent from the hereinafter following commentary taken in conjunction with the following figures of drawings.

BRIEF DESCRIPTION OF THE DRAWINGS

FIG. 3(a) is a top, plan view of a flat sheet of air permeable material having an adhesive strip thereon;

FIG. 3(b) is a side-elevational view showing the flat sheet of FIG. 3(a) formed into a first tubular member sealed along adjoining opposed sides, having the adhesive strip shown in phantom line;

FIG. 3(c) is a side-elevational view similar to FIG. 3(b) showing one end of the first tubular member closed and sealed;

FIG. 3(d) is a side-elevational view similar to FIG. 3(c) showing a second hollow tubular member being inserted into the open end of the first tubular member;

FIG. 3(e) is a side-elevational view similar to FIG. 3(d) showing the completely constructed tubular air permeable filter bag;

FIG. 4 is a perspective view of a nozzle member; and

FIG. 5 is a perspective view of an alternate nozzle member.

DESCRIPTION OF THE BEST EMBODIMENTS CONTEMPLATED

Figure 1:
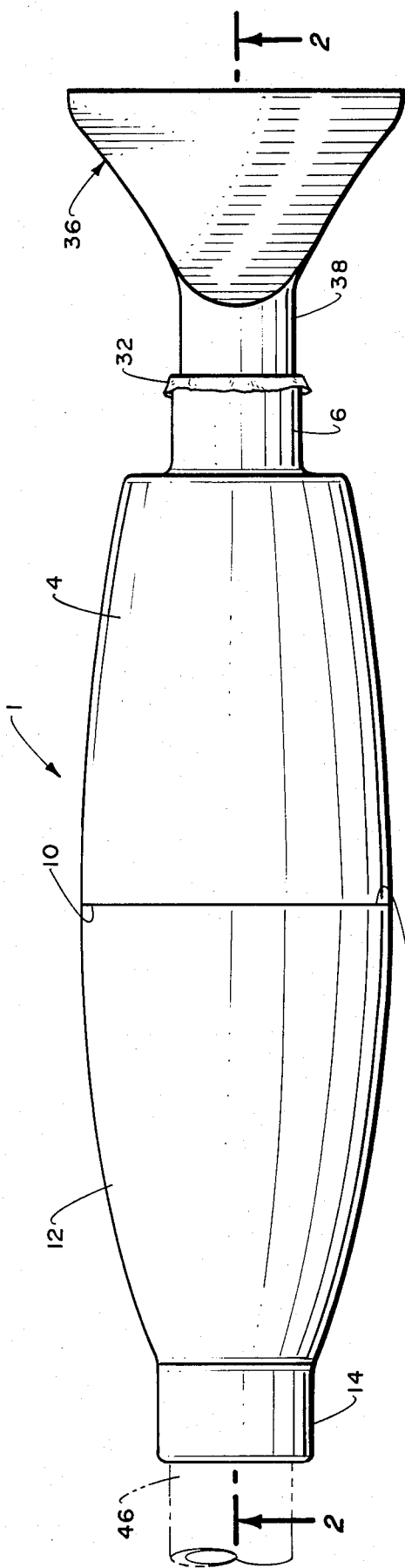
FIG. 1 is a top, plan view of the device showing in phantom line a suction extension hose of a suction cleaning machine attached to the device.

Referring to the figures of drawings wherein like members of reference designate like elements throughout, the device of the invention comprises a hollow housing 1 having an interior cavity 2 defined by a first tubular housing member 4 having a first extending, elongate portion 6 terminating in a first aperture 8 normal to the axis thereof and an opposite first open end 10, threadably secured to a second tubular housing member 12 having a second extending, elongate portion 14 with a second aperture 16 normal to the axis thereof, and having an opposite second open end 18. The first housing member 4 and the second housing member 12 are adapted to releasably engage one another to form the hollow housing 1.

Figure 2:
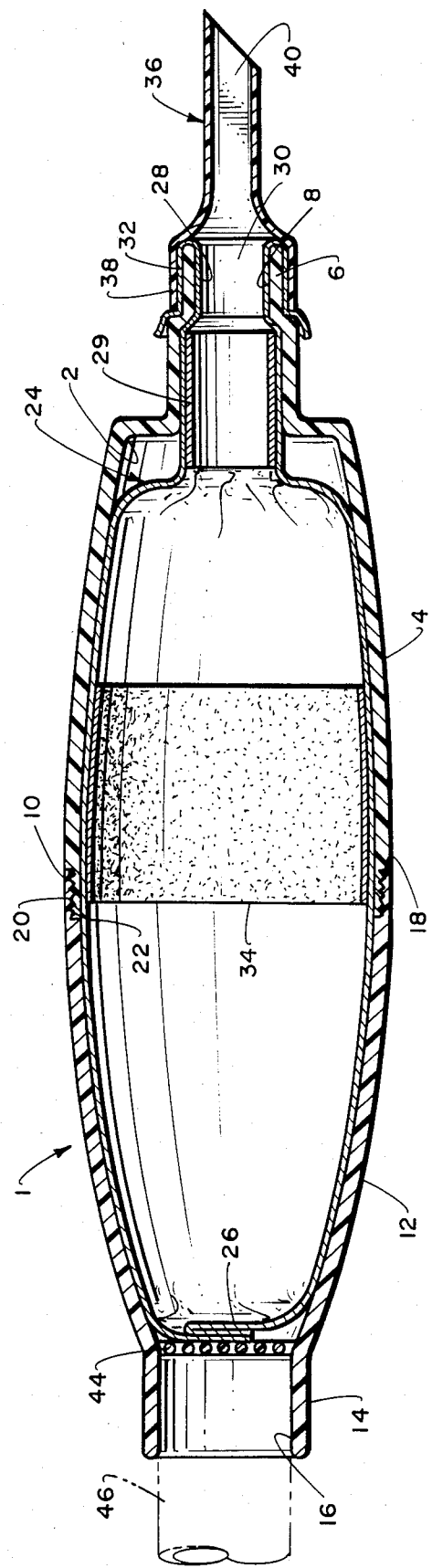
FIG. 2 is a cross-sectional, side-elevational view of the device taken along the line 2—2 of FIG. 1.

In the preferred embodiment illustrated in the drawings, best seen in FIG. 2, a portion of the exterior surface of the first housing member 4 adjacent its first open end 10 has male screw threads 20. These male screw threads are received by female threads 22 on the interior wall of the second tubular housing member 12 adjacent its second open end 18. Threads 20 and 22 are so configured as to threadably associate, thereby forming hollow housing 1.

In an alternate embodiment, not shown, male and female snap-fitting friction fit members may be used in place of the threads to hold the first and second tubular housing members in a fixed relationship, thereby forming the desired hollow housing.

A tubular, air permeable filter bag 24 having a first closed end 26 and an opposite, extending, elongate end 28 having an aperture 30 normal to the axis thereof, as shown in FIG. 2, is adapted to be received and captively retained in the interior cavity 2 of hollow housing 1.

A circular adhesive ring 34 on the interior surface of tubular filter bag 24 is shown intermediate the first closed end 26 and opposite extending, elongate end 28 and is normal to the axis thereof. Adhesive strip ring 34 prevents living insects drawn into the filter bag from exiting therefrom through aperture 30 upon disposal of the filter bag. Adhesive strip 34 should be fabricated from a contact glue, such as that utilized in commercially available contact fly paper, wherein the insect becomes mired and retained by the adhesive as it attempts to cross or contacts the adhesive.

Extending elongate end 28 of filter bag 24 projects outwardly through first aperture 8 and a portion of the wall thereof adjacent aperture 30 and is folded to form a lip-like portion 32 covering a portion of the exterior surface of the first extending, elongate portion 6 adjacent and surrounding first aperture 8.

A relatively smaller tubular member 29 so held by glue heat seal, or the like bonding method, is to strengthen the extending elongate portion 28.

A tubular nozzle member 36 has a first open end 38 adapted to receive and retain therein, in a releasable friction fit, the first extending, elongate portion 6 and the folded lip-like portion 32 of the extending, elongate end 28 of filter bag 24. Nozzle member 36 has a second open end 40 adapted to selectively direct objects into nozzle member 36 and channel the objects toward the interior of filter bag 24.

FIGS. 1, 2 and 4 illustrate nozzle member 36 in position on extending, elongate portion 6. The rectangular aperture 40 of nozzle member 32 is designed to offer an expanded opening by which insects may be selectively drawn into filter bag 24. Nozzle 36 would prove most useful in open, easily accessible areas, such as floors or walls. FIG. 5 illustrates an alternately shaped nozzle member 42 having a rectangular opening of reduced cross-sectional area to that of nozzle member 36, so as to better reach restricted or crowded areas, such as, baseboards, cracks and the like.

A screen member 44 is attached at its perimetric boundary 2, or in the alternative integrally formed with the interior surface of second extending, elongate portion 14 and normal to the axis thereof. Screen member 44 is adapted to permit air, but not the filter bag 24, to exit interior cavity 2 once suction is applied to interior cavity 2.

The second aperture 16 of second extending, elongate portion 14 of second tubular housing member 12 is adapted to receive and retain therein, in a releasable friction fit, a tubular suction cleaner extension hose member 46, shown in FIGS. 1 and 2 in phantom line adapted to be attached to a vacuum source, not shown.

Another aspect of the invention is the disposable, tubular, air permeable filter bag 48 having a first closed end 50 and an opposite extending, elongate end 52 having an aperture 54 normal to the axis thereof. A circular adhesive ring 56 is shown on the interior surface of filter bag 48 intermediate closed end 50 and extending, elongate end 52 and normal to the axis thereof.

The filter bag also has a sealing means. In a preferred embodiment a wire twister member is attached to the exterior surface of the filter bag normal to the axis thereof, and adjacent the aperture in the filter bag.

Preferred embodiments of the filter bag may be fabricated from air permeable paper, plastic or cloth, so that removal, disposal and replacement of the used filter bag will be both economical and easy.

FIGS. 3(a) through 3(e) illustrate a process by which the disposable filter bags of the invention may be easily and economically fabricated. More specifically, the fabrication process, in a preferred embodiment, occurs as described below.

FIG. 3(a) shows a flat sheet 58 of air permeable filter material of conventional type as is currently used in vacuum cleaner filter bags and the like having an adhesive strip 60 intermediate its opposing sides 62 and 64.

FIG. 3(b) shows the flat sheet 58 rolled and sealed along edges 66 to form a hollow, tubular member 68. Note that adhesive strip 60 has now, by the rolling process, been formed into a circular adhesive ring 70 intermediate opposing ends 62 and 64. The adhesive strip should be fabricated from a contact glue, such as that utilized in commercially available contact fly paper, wherein the insect becomes mired and retained by the adhesive as it attempts to cross over or to come in contact with the adhesive.

FIG. 3(c) shows end 62 folded and sealed to form a closed end 72.

FIG. 3(d) indicates how a relatively smaller tubular member 74 may be inserted into the remaining open end 64 of tubular member 68 to strengthen the extending, elongate portion 54. Tubular member 74 may be fabricated from cardboard, plastic or the like relatively stiff material to strengthen the extending, elongate portion 54.

FIG. 3(e) shows the completely fabricated filter bag 48 having open end 54 formed into an extending, elongate portion 52 by being constricted to surround tubular member 74 and so held in position by glue, heat seal, or the like bonding method.

The invention described above in its preferred embodiment may be used in the following manner.

Hollow housing 1 is opened and a filter bag is inserted into the interior cavity of the first housing member, so that the extending, elongate end of the filter bag projects outwardly through the first aperture and the portion of the wall thereof adjacent the first aperture and is folded to form a lip-like portion covering a portion of the exterior surface of the first extending, elongate portion of the first housing member and surrounding the first aperture.

A nozzle member is then positioned to receive and retain in one open end, in a releasable friction fit, the first extending, elongate portion of the first housing member and the folded lip-like portion of tne extending, elongate end of the filter bag.

The first housing member is then joined to the second housing member forming the hollow housing having the filter bag received and retained in the interior thereof.

An extension suction hose of a vacuum cleaner is inserted and retained in the second extending, elongate portion of the second hollow housing.

The invention is now ready for use.

The vacuum cleaner will draw air, insects and the like into the opened aperture of the nozzle member, which, in turn, will direct them to the interior of the filter bag where they will be received and retained for later disposal.

The adhesive strip on the interior surface of the filter bag prevents living insects drawn into the filter bag from exiting therefrom through its opening upon disposal of the filter bag or the removal of the suction force provided by the vacuum cleaner.

To remove and dispose of the captured pests, the hollowed housing is disassembled, the nozzle member removed and the filter bag withdrawn. A wire twister is provided to seal the opening of the filter bag to insure that no insects escape from the filter bag upon its disposal.

A new filter bag may now be inserted as described above, and the invention is once again ready for use.

The invention described above is, of course, susceptible of many variations and modifications, all of which are within the skill of the art. It should be understood that all such variations and modifications are within the spirit and scope of the invention and of the appended claims. Similarly, it will be understood that it is intended to cover all changes and modifications of the examples of the invention herein disclosed for the purposes of illustration which do not constitute departures from the spirit and scope of the invention.

I claim:

1. A pest disposal device comprising the combination of: a hollow housing having an interior cavity defined by a first tubular housing member having a first extending, elongate portion having a first aperture adapted to be attached to a nozzle or the like and an opposite first open end, and a second tubular housing member having a second extending, elongate portion having a second aperture adapted to be connected to a vacuum source and an opposite second end, said first open end of said first tubular housing member and said second open end of said second tubular housing member being releasably engaged to form said hollow housing; a tubular air permeable filter bag having a first closed end and an opposite extending, elongate end having an aperture adapted to project outwardly through said first aperture of said first tubular housing member for securement therewith and retained within said housing; said filter bag having an adhesive area on the interior surface of said tubular filter bag intermediate said first closed end and said opposite extending, elongate end.

2. The device in accordance with claim 1 wherein said second tubular housing member integrally forms a screen member in its interior adapted to permit air but not said filter bag to enter said second extending, elongate portion of said second tubular housing member.

3. The device in accordance with claim 1 wherein a screen member is attached at its perimetric boundary to the interior surface of said second, extending, elongate portion of said second tubular housing member normal to the axis thereof, and adapted to permit air but not said filter bag, to exit said interior cavity of said hollow housing member.

4. The device in accordance with claim 1 wherein said opposite extending, elongate end of said filter bag is secured and retained within said hollow housing by folding to form a lip-like portion covering a portion of the exterior surface of said first extending, elongate portion of said first tubular housing member adjacent and surrounding said first aperture in said first tubular housing member.

5. The device in accordance with claim 4 which additionally includes a tubular nozzle member having a first open end adapted to receive and retain therein in a releasable friction fit, said first extending, elongate portion of said first tubular housing member and said folded lip-like portion of said extending, elongate end of said filter bag and a second open end adapted to selectively direct objects into the bore of said nozzle member.

6. The device in accordance with claim 1 wherein a portion of the exterior surface of said first tubular housing member adjacent said first open end has male screw threads adapted to be received and threadably associate with female screw threads on a portion of the interior wall of said second tubular housing member adjacent said second open end.

7. The device in accordance with claim 1 additionally including a sealing means to prevent objects received into said filter bag from exiting therefrom through said aperture in said air permeable filter bag upon the disposal of said air permeable filter bag.

8. The device in accordance with claim 7 wherein said sealing means is a wire twister member attached to the exterior surface of said air permeable filter bag, normal to the axis thereof, and adjacent said aperture in said air permeable filter bag.

9. The device in accordance with claim 1 wherein said second aperture in said second extending, elongate portion of said second tubular housing member is adapted to receive and retain therein in a releasable friction fit, a tubular suction cleaner extension hose member.

10. The device in accordance with claim 1 wherein said second open end of said tubular nozzle member has a rectangular cross-sectional area normal to the axis of said tubular nozzle member.

11. In a pest and the like container defining an air permeable bag having a first closed end and an opposite, extending, elongate end, having an aperture, the improvement which comprises: an adhesive area on the interior surface of said tubular, air permeable bag intermediate said first closed end and said opposite, extending, elongate end; and a wire twister member attached to the exterior surface of said tubular, air permeable bag adjacent said aperture in said tubular air permeable bag, said adhesive area being of sufficient size and depth to ensnare falling insects and the like and trap the same within said container.

* * * * *